United States Patent
Yang et al.

(10) Patent No.: US 10,019,094 B2
(45) Date of Patent: Jul. 10, 2018

(54) PRESSURE SENSING DISPLAY PANEL AND PRESSURE SENSING METHOD

(71) Applicants: BOE TECHNOLOGY GROUP CO., LTD., Beijing (CN); HEFEI XINSHENG OPTOELECTRONICS TECHNOLOGY CO., LTD., Hefei (CN)

(72) Inventors: Tong Yang, Beijing (CN); Tingting Zhao, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/510,415

(22) PCT Filed: Sep. 5, 2016

(86) PCT No.: PCT/CN2016/098083
§ 371 (c)(1),
(2) Date: Mar. 10, 2017

(87) PCT Pub. No.: WO2017/181576
PCT Pub. Date: Oct. 26, 2017

(65) Prior Publication Data
US 2018/0095568 A1    Apr. 5, 2018

(30) Foreign Application Priority Data
Apr. 21, 2016 (CN) .......................... 2016 1 0252071

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01); *G06F 2203/04103* (2013.01); *G06F 2203/04112* (2013.01)

(58) Field of Classification Search
CPC ...... G06F 3/0412; G06F 3/0416; G06F 3/044; G06F 2203/04103; G06F 2203/04112
See application file for complete search history.

(56) References Cited

U.S. PATENT DOCUMENTS

2006/0279548 A1* 12/2006 Geaghan ............... G06F 3/0416
345/173
2010/0194710 A1* 8/2010 Koito .................... G06F 3/0412
345/174
(Continued)

FOREIGN PATENT DOCUMENTS

CN         101872273 A        10/2010
CN         102109690 A        6/2011
(Continued)

OTHER PUBLICATIONS

International Search Report & Written Opinion dated Dec. 29, 2016 regarding PCT/CN2016/098083.
(Continued)

*Primary Examiner* — Sahlu Okebato
(74) *Attorney, Agent, or Firm* — Intellectual Valley Law, P.C.

(57) ABSTRACT

The present application discloses a display panel having a first display substrate and a second display substrate facing the first display substrate, the display panel includes a floating electrode layer including a plurality of floating electrodes on the first display substrate; the floating electrode layer being spaced apart from the second display substrate by a distance; a driving electrode layer including a plurality of driving electrodes on the second display substrate; and a sensor electrode layer including a plurality of sensor electrodes on the second display substrate; each of the plurality of floating electrodes corresponding to a pair of driving electrode and sensor electrode. The floating electrode layer, the driving electrode layer, and the sensor
(Continued)

electrode layer are configured so that at least one of the plurality of floating electrodes is movable relative to at least one of a corresponding driving electrode and a corresponding sensor electrode in response to a pressure from a touch, resulting in a detectable capacitance change between the corresponding driving electrode and the corresponding sensor electrode.

20 Claims, 6 Drawing Sheets

(56) References Cited

U.S. PATENT DOCUMENTS

| | | | |
|---|---|---|---|
| 2011/0122273 A1 | | 5/2011 | Kanemitsu et al. |
| 2015/0070305 A1 | | 3/2015 | Seo et al. |
| 2016/0342256 A1 | * | 11/2016 | Zhou .................. G06F 3/0412 |

FOREIGN PATENT DOCUMENTS

| | | |
|---|---|---|
| CN | 204965385 U | 1/2016 |
| CN | 105487273 A | 4/2016 |
| CN | 205563528 U | 9/2016 |
| KR | 20120052044 A | 5/2012 |
| TW | 201120696 A | 6/2011 |

OTHER PUBLICATIONS

First Office Action in the Chinese Patent Application No. 201610252071.X, dated Apr. 19, 2018; English translation attached.

\* cited by examiner

PRESSURE SENSING DISPLAY PANEL AND PRESSURE SENSING METHOD

CROSS-REFERENCE TO RELATED APPLICATION

This application is a national stage application under 35 U.S.C. § 371 of International Application No. PCT/CN2016/098083, filed Sep. 5, 2016, which claims priority to Chinese Patent Application No. 201610252071.X, filed Apr. 21, 2016, the contents of which are incorporated by reference in the entirety.

TECHNICAL FIELD

The present invention relates to display technology, more particularly, to a pressure sensing display panel, a display apparatus having the same, a method of sensing pressure in the display panel, and a fabricating method thereof.

BACKGROUND

Conventional touch devices can be generally categorized into resistive, capacitive, optical, sound wave, and electromagnetic designs. In recent years, touch devices have been widely used in many electronic devices such as mobile phones, computer display panels, touch screens, satellite navigation devices, digital cameras, etc. In conventional capacitive touch devices, the point on the display panel touched by a finger is detected by detecting the change in the capacitance of the capacitor coupled with the finger through a touch sensing electrode. The conventional touch devices can only detect a two-dimensional location of a touch event, and are unable to detect a third dimension of the touch event, i.e., a pressure applied by the touch.

SUMMARY

In one aspect, the present invention provides a display panel having a first display substrate and a second display substrate facing the first display substrate, comprising a floating electrode layer comprising a plurality of floating electrodes on the first display substrate; the floating electrode layer being spaced apart from the second display substrate by a distance; a driving electrode layer comprising a plurality of driving electrodes on the second display substrate; and a sensor electrode layer comprising a plurality of sensor electrodes on the second display substrate; each of the plurality of floating electrodes corresponding to a pair of driving electrode and sensor electrode; wherein the floating electrode layer, the driving electrode layer, and the sensor electrode layer are configured so that at least one of the plurality of floating electrodes is movable relative to at least one of a corresponding driving electrode and a corresponding sensor electrode in response to a pressure from a touch, resulting in a detectable capacitance change between the corresponding driving electrode and the corresponding sensor electrode.

Optionally, the driving electrode layer is a common electrode signal line layer comprising a plurality of common electrode signal lines; the common electrode signal line layer is operated in a time-division driving mode; the time-division driving mode comprises a display mode and a touch control mode; the common electrode signal line layer is configured to provide a common voltage to a common electrode in the display mode, and is configured to drive pressure sensing in the touch control mode.

Optionally, the pressure from the touch results in a first change in distance between the at least one of the plurality of floating electrodes and the corresponding driving electrode, and a second change in distance between the at least one of the plurality of floating electrodes and the corresponding sensor electrode; the detectable capacitance change is generated in response to the first change in distance and the second change in distance.

Optionally, a projection of each of the plurality of floating electrodes at least partially overlaps with a projection of a corresponding driving electrode and a projection of a corresponding sensor electrode on the second display substrate in plan view of the display panel, respectively.

Optionally, each of the plurality of floating electrodes comprising a floating conductive material.

Optionally, the driving electrode layer and the sensor electrode layer are in a same layer.

Optionally, the display panel further comprises a sensor electrode signal line layer comprising a plurality of sensor electrode signal lines; each of the plurality of sensor electrode signal line electrically connected to each of the plurality of sensor electrodes.

Optionally, the sensor electrode signal line layer and the driving electrode layer are in different layers, the plurality of sensor electrode signal lines and the plurality of driving electrodes extending along a substantially the same direction.

Optionally, the display panel further comprises an insulating layer between the sensor electrode layer and the sensor electrode signal line layer; and a plurality of vias extending through the insulating layer, each of the plurality of the sensor electrodes electrically connected to each of the plurality of the sensor electrode signal lines through a via.

Optionally, the display panel further comprises a gate line layer comprising a plurality of gate lines; the gate line layer and the driving electrode layer are in different layers; a projection of the gate line layer substantially overlaps with a projection of the driving electrode layer on the second display substrate in plan view of the display panel.

Optionally, the display panel further comprises a spacer layer comprising a plurality of spacers for maintaining a spacing between the first display substrate and the second display substrate; a thickness of the floating electrode layer is less than a thickness of the spacer layer.

Optionally, the display panel further comprises a main sensor electrode signal line layer comprising a plurality of main sensor electrode signal lines; each of the plurality of main sensor electrode signal lines being electrically connected to at least two sensor electrode signal lines.

Optionally, each of the plurality of main sensor electrode signal lines is electrically connected to at least two adjacent sensor electrode signal lines.

Optionally, each of the plurality of main sensor electrode signal lines is electrically connected to at least two sensor electrode signal lines that are spaced apart by at least one sensor electrode signal line.

In another aspect, the present invention provides a method of fabricating a display panel having a first display substrate and a second display substrate facing the first substrate, comprising forming a floating electrode layer comprising a plurality of floating electrodes on a first base substrate; forming a driving electrode layer comprising a plurality of driving electrodes on a second base substrate; and forming a sensor electrode layer comprising a plurality of sensor electrodes on the second base substrate; wherein the floating electrode layer, the driving electrode layer, and the sensor electrode layer are formed so that a projection of each of the plurality of floating electrodes at least partially overlaps with a project of a corresponding driving electrode and a projection of a corresponding sensor electrode on the second base substrate in plan view of the display panel; and the floating electrode layer is formed to be spaced apart from the second base substrate by a distance in the display panel.

Optionally, the driving electrode layer is a common electrode signal line layer comprising a plurality of common electrode signal lines.

Optionally, each of the plurality of floating electrodes comprising a floating conductive material.

Optionally, the driving electrode layer and the sensor electrode layer are formed in a same layer.

Optionally, the method further comprises forming a sensor electrode signal line layer comprising a plurality of sensor electrode signal lines; each of the plurality of sensor electrode signal line is formed to be electrically connected to each of the plurality of sensor electrodes.

Optionally, the sensor electrode signal line layer and the driving electrode layer are formed in different layers, the plurality of sensor electrode signal lines and the plurality of driving electrodes are formed to extend along a substantially the same direction.

Optionally, the method further comprises forming a gate line layer comprising a plurality of gate lines; the gate line layer and the driving electrode layer are formed in different layers; the gate line layer and the driving electrode layer are formed so that a projection of the gate line layer substantially overlaps with a projection of the driving electrode layer on the second base substrate in plan view of the display panel.

Optionally, the method further comprises forming a spacer layer comprising a plurality of spacers for maintaining a spacing between the first display substrate and the second display substrate; wherein a thickness of the floating electrode layer is less than a thickness of the spacer layer.

In another aspect, the present invention provides a display apparatus comprising a display panel described herein or fabricated by a method described herein.

Optionally, the display apparatus further comprises a processor configured to detect a first signal at the corresponding sensor electrode when a pressure is applied to the display panel; and configured to determine an amount of pressure applied to the display panel based on the first signal.

Optionally, the processor comprises a comparator configured to compare the first signal with a control value thereby determining the amount of pressure applied to the display panel based on a result of comparing.

Optionally, the processor is configured to detect a second signal at the corresponding sensor electrode in absence of the pressure; and the control value is the second signal detected at the corresponding sensor electrode in absence of the pressure.

Optionally, the display apparatus further comprises a controller configured to provide an AC signal to the driving electrode layer in a time interval between display of two adjacent frames of images in the display panel; wherein the processor is configured to detect the first signal in response to the AC signal provided to the driving electrode layer.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

In recent years, pressure sensing touch display panels have been developed for detecting different levels of force being applied to the display panels. Examples of pressure sensing touch methods include force touch and 3D touch. However, these methods require significant re-design of the display device to accommodate additional components for pressure sensing, which is typically included in the back light module or mid-frame portion of the display device. These modifications often result in higher manufacturing costs and increase the bulk of the display device such as a mobile phone.

Accordingly, the present invention is directed to a pressure sensing display panel, a display apparatus having the same, a method of sensing pressure in the display panel, and a fabricating method thereof that substantially obviate one or more of the problems due to limitations and disadvantages of the related art. In one aspect, the present disclosure provides a pressure sensing display panel having a first display substrate and a second display substrate facing the first substrate. In some embodiments, the display panel includes a floating electrode layer including a plurality of floating electrodes on the first display substrate; the floating electrode layer being spaced apart from the second display substrate by a distance; a driving electrode layer including a plurality of driving electrodes on the second display substrate; and a sensor electrode layer including a plurality of sensor electrodes on the second display substrate. Optionally, the floating electrode layer, the driving electrode layer, and the sensor electrode layer are configured so that at least one of the plurality of floating electrodes is movable relative to at least one of (e.g., both) a corresponding driving electrode and a corresponding sensor electrode in response to a pressure from a touch, resulting in a detectable capacitance change between the corresponding driving electrode and the corresponding sensor electrode. In another aspect, the present disclosure provides a method for sensing pressure in a display panel. In some embodiments, the method includes detecting a first signal at the corresponding sensor electrode when a pressure is applied to the display panel; and determining an amount of pressure applied to the display panel based on the first signal.

The driving electrode layer may be any appropriate electrode layer. For example, the driving electrode layer may be an electrode layer specifically designated for pressure sensing. Optionally, the driving electrode layer may be operated in a time-division driving mode. For example, the driving electrode layer is a common electrode signal line layer including a plurality of common electrode signal lines. Optionally, the time-division driving mode includes a display mode and a touch control mode. Optionally, the common electrode signal line is configured to provide a common voltage to a common electrode in display mode. Optionally, the common electrode signal line is configured to drive pressure sensing in touch control mode.

Figure 1:
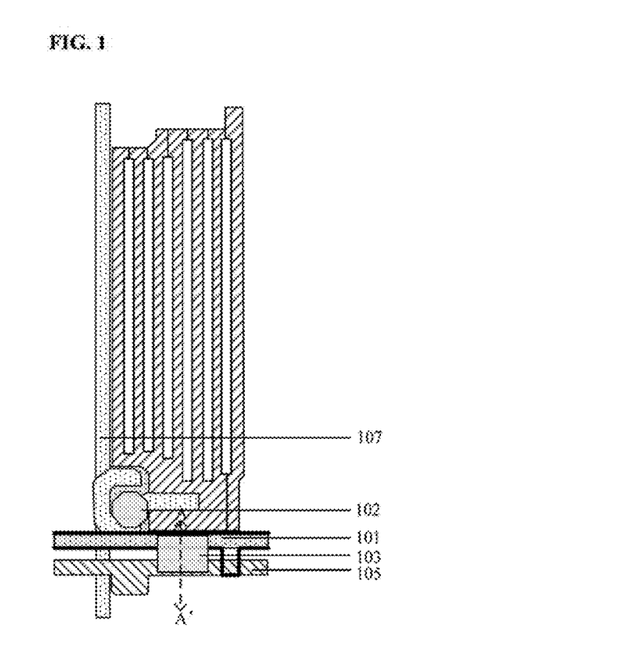
FIG. 1 is a diagram illustrating the structure of a display panel in some embodiments.
Figure 2:
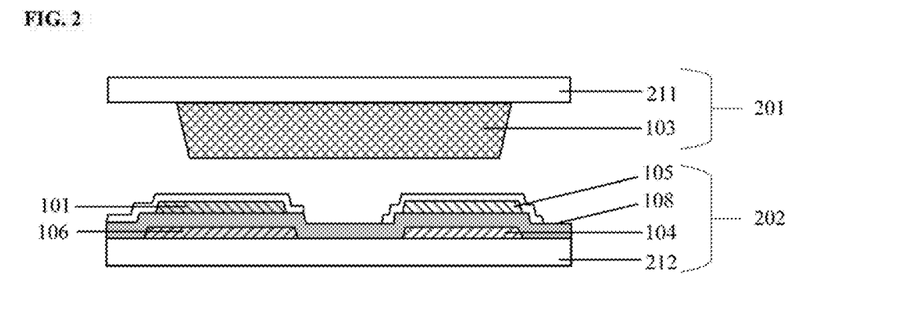
FIG. 2 is a cross-sectional view along the A-A' line in FIG. 1.

FIG. 1 is a diagram illustrating the structure of a display panel in some embodiments. FIG. 2 is a cross-sectional view along the A-A' line in FIG. 1. Referring to FIGS. 1 and 2, the display panel in the embodiments includes a first display substrate 201, and second display substrate 202 facing the first display substrate 201. The display panel has a floating electrode layer 103 on a first base substrate 211 including a plurality of floating electrodes. The floating electrode layer 103 is spaced apart from the second display substrate 202. As shown in FIG. 2, each of the plurality of floating electrodes is not in contact with the second display substrate 202.

Referring to FIG. 2, in the second display substrate 202, a driving electrode layer 101 having a plurality of driving electrodes is disposed on an insulating layer 108. In FIG. 2, the driving electrode layer 101 is a common electrode signal line layer 101 including a plurality of common electrode signal lines. A sensor electrode layer 105 having a plurality of sensor electrodes is disposed on the insulating layer 108. A projection of each of the plurality of floating electrodes 103 at least partially overlaps with a project of a corresponding common electrode signal line 101 and a projection of a corresponding sensor electrode 105 on the second display substrate 202 in plan view of the display panel, respectively. The projection of the corresponding common electrode signal line 101 and the projection of the corresponding sensor electrode 105 on the second display substrate 202 in plan view of the display panel, however, do not overlap with each other. Thus, a group of a floating electrode 103, a common electrode signal line 101, and a sensor electrode 105 form a pressure detection unit. The floating electrode 103 is spaced apart from the corresponding common electrode signal line 101 by a first distance, e.g., a first normal distance between the floating electrode 103 and the corresponding common electrode signal line 101. The floating electrode 103 is spaced apart from the corresponding sensor electrode 105 by a second distance, e.g., a second normal distance between the floating electrode 103 and the corresponding sensor electrode 105. Optionally, the common electrode signal line layer and the sensor electrode layer are in a same layer. Optionally, the common electrode signal line layer and the sensor electrode layer have a same height. Optionally, the first distance and the second distance are the same.

Figure 3:
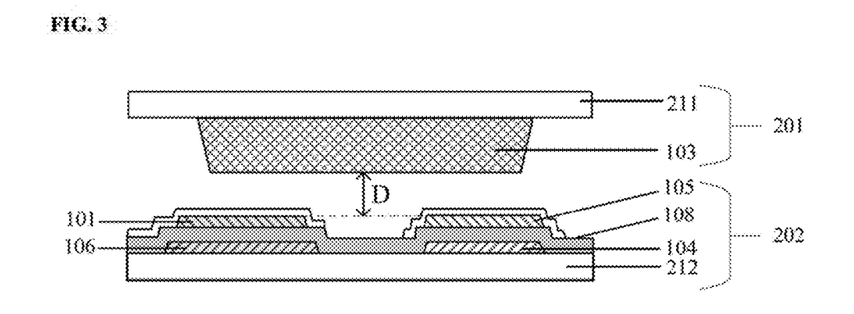
FIG. 3 is a diagram illustrating the structure of a display panel in some embodiments when a pressure is not applied to the display panel.
Figure 4:
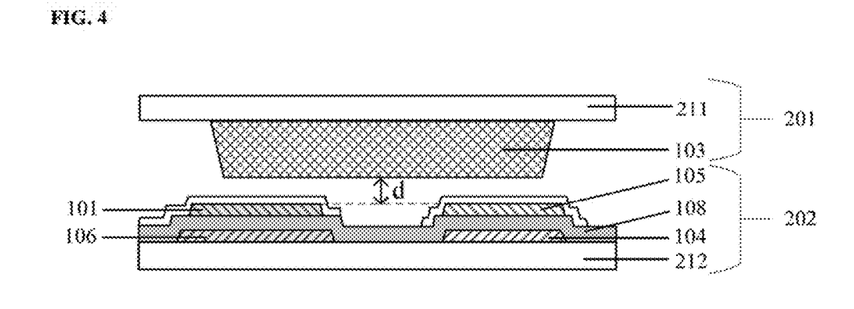
FIG. 4 is a diagram illustrating the structure of a display panel in some embodiments when a pressure is applied to the display panel.

FIG. 3 is a diagram illustrating the structure of a display panel in some embodiments when a pressure is not applied to the display panel. The first distance and the second distance in FIG. 3 are a same distance D. Referring to FIG. 3, the floating electrode 103 is spaced apart from the corresponding common electrode signal line 101 by a normal distance D, and the floating electrode 103 is spaced apart from the corresponding sensor electrode 105 by a same normal distance D. FIG. 4 is a diagram illustrating the structure of a display panel in some embodiments when a pressure is applied to the display panel. Referring to FIG. 4, the floating electrode 103 is spaced apart from the corresponding common electrode signal line 101 by a normal distance d, and the floating electrode 103 is spaced apart from the corresponding sensor electrode 105 by a same normal distance d.

In some embodiments, a pressure from a touch event results in a first change in distance between the at least one of the plurality of floating electrodes 103 and the corresponding common electrode signal line 101, and a second change in distance between the at least one of the plurality of floating electrodes 103 and the corresponding sensor electrode 105. Referring to FIGS. 3 and 4, the pressure from the touch event results in a first change in distance between the at least one of the plurality of floating electrodes 103 and the corresponding common electrode signal line 101, i.e., a first $\Delta d=(D-d)$. Similarly, the pressure from the touch event results in a second change in distance between the at least one of the plurality of floating electrodes 103 and the corresponding sensor electrode 105, i.e., a second $\Delta d=(D-d)$.

Referring to FIG. 2, the display panel in the embodiment further includes a sensor electrode signal line layer 104 having a plurality of sensor electrode signal lines. Each of the plurality of sensor electrode signal line 104 is electrically connected to each of the plurality of sensor electrodes 105. The sensor electrode signal line layer 104 is on a side of the insulating layer 108 distal to the sensor electrode layer 105, and on a side of a second base substrate 212 proximal to the insulating layer 108. Optionally, the sensor electrode signal line layer 104 and the common electrode signal line layer 101 are in different layers, the plurality of sensor electrode signal lines 104 and the plurality of common electrode signal lines 101 extending along a substantially the same direction.

Referring to FIG. 2, the display panel in the embodiment further includes a gate line layer 106 having a plurality of gate lines. The gate line layer 106 and the common electrode signal line layer 101 are in different layers. Optionally, a projection of the gate line layer 106 substantially overlaps with a projection of the common electrode signal line layer 101 on the second display substrate in plan view of the display panel. The plurality of gate lines 106 and the plurality of common electrode signal lines 101 extend along a substantially the same direction. Optionally, the gate line layer 106 is on a side of the insulating layer 108 distal to the common electrode signal line layer 101, and on a side of the second base substrate 212 proximal to the insulating layer 108.

Referring to FIG. 1, the display panel in the embodiment further includes a spacer layer 102 having a plurality of spacers for maintaining a spacing between the first display substrate 201 and the second display substrate 202. For example, each of the spacer may have a first end and a second end. The first end is in contact with the first display substrate 201 and the second end is in contact with the second display substrate 202. The spacer layer 102 has a thickness larger than that of the floating electrode layer 103. For example, the floating electrode layer 103 is spaced apart from the second display substrate 202 by a distance whereas the spacer layer 102 is in contact with the second display substrate 202. Optionally, the floating electrode layer 103 and the spacer layer 102 may be formed in a same process, e.g., in a same layer. Optionally, the floating electrode layer 103 and the spacer layer 102 may be both made of a conductive material, or a dielectric material doped with a conduction material. Optionally, the floating electrode layer 103 includes an insulating sub-layer and a conductive sub-layer, the conductive sublayer being on a side of the insulating sub-layer proximal to the second display substrate 202. Optionally, the insulating sub-layer of the floating electrode layer 103 and the spacer layer 102 are formed using a dielectric material in a same process, e.g., in a same layer, followed by forming the conductive sub-layer on a side of the insulating sub-layer proximal to the second display substrate 202.

The floating electrode 103 includes a floating conductive material. For example, the floating electrode 103 may be made of a conductive material, or may be coated with a layer of conductive material on its surface, e.g., the surface proximal to the common electrode signal line 101 and the sensor electrode 105. Accordingly, a first capacitance C1 is formed between the floating electrode 103 and the corresponding common electrode signal line 101, and a second capacitance C2 is formed between the floating electrode 103 and the corresponding sensor electrode 105.

Referring to FIG. 3, when a pressure is not applied to the display panel, the floating electrode 103 is spaced apart from the corresponding common electrode signal line 101 by a normal distance D, and is spaced apart from the corresponding sensor electrode 105 by a same normal distance D. The first capacitance between the floating electrode 103 and the corresponding common electrode signal line 101 is C1, and the second capacitance between the floating electrode 103 and the corresponding sensor electrode 105 is C2. A third capacitance C3 between the corresponding common electrode signal line 101 and the corresponding sensor electrode 105 may be calculated according to Equation (1):

$$C3 = C1*C2/(C1+C2) \quad (1).$$

Referring to FIG. 4, when a pressure is applied to the display panel, the floating electrode 103 is spaced apart from the corresponding common electrode signal line 101 by a normal distance d, and is spaced apart from the corresponding sensor electrode 105 by a same normal distance d. The first capacitance between the floating electrode 103 and the corresponding common electrode signal line 101 is C1', and the second capacitance between the floating electrode 103 and the corresponding sensor electrode 105 is C2'. C1'=C1*D/d, and C2'=C2*D/d. The third capacitance C3' between the corresponding common electrode signal line 101 and the corresponding sensor electrode 105 may be calculated according to Equation (2):

$$C3' = C1'*C2'/(C1'+C2') = C3*D/d \quad (2).$$

Thus, when the first distance and the second distance decrease from D to d, the third capacitance increases from C3 to C3', i.e., C3'>C3. Accordingly, when the pressure from the touch results in a first change in distance between the floating electrode 103 and the corresponding common electrode signal line 101, and a second change in distance between the floating electrode 103 and the corresponding sensor electrode 105, a capacitance change is generated in response to the first change in distance and the second change in distance. When the first change in distance and the second change in distance are decreases in distance, the capacitance change is an increase in capacitance. Pressure sensing may be achieving by detecting the capacitance change generated in response to the first change in distance and the second change in distance. In some embodiments, the floating electrode layer 103, the common electrode signal line layer 101, and the sensor electrode layer 105 are configured so that at least one of the plurality of floating electrodes 103 is movable relative to at least one of (e.g., both) a corresponding common electrode signal line 101 and a corresponding sensor electrode 105 in response to a pressure from a touch, resulting in a detectable capacitance change between the corresponding common electrode signal line 101 and the corresponding sensor electrode 105.

During display of a frame of image in the display panel, a DC signal have a voltage V is provided to the common electrode signal line 101. During a time interval between display of any two adjacent frames of images in the display panel, a high frequency AC signal oscillating around the voltage V is provided to the common electrode signal line 101. The frequency of the AC signal is much higher than that of the liquid crystal response speed. Due to the capacitance between the common electrode signal line 101 and the sensor electrode 105, the sensor electrode 105 is able to sense the high frequency signal transmitted in the common electrode signal line 101, i.e., the high frequency signal transmitted in the common electrode signal line 101 induces a signal in the sensor electrode 105. With an increase in the capacitance between the common electrode signal line 101 and the sensor electrode 105, the induced signal also increases. Thus, by detecting the induced signal in the sensor electrode 105, an amount of pressure applied to the display panel may be determined based on the detected induced signal. Based on the determined amount of applied pressure, the touch event may be categorized into, e.g., a tap, a press (e.g., a light press or a soft press), a push (e.g., a deep press or a hard press), etc. For example, a plurality of threshold values of amount of applied pressure may be used for categorizing the touch event. Examples of threshold values include, but are not limited to, a tap threshold value, a light press threshold value, and a deep press threshold value. When the amount of applied pressure is larger than the tap threshold value by still less than that light press threshold value, the touch event may be determined to be a tap. When the amount of applied pressure is between the light press threshold value and the deep press threshold value, the touch event may be determined to be a light press. When the amount of applied pressure is larger than the deep press threshold value, the touch event may be determined to be a deep press.

The present pressure sensing display panel provides a highly sensitive three-dimensional touch detection device that only requires minimal modification of an existing display panel. In the present display panel, the components for pressure-sensing is fully integrated into the display panel. As compared to other pressure-sensing device, the present display panel may be made thinner and lighter with a lower manufacturing cost.

When a pressure is not applied to the display panel, a capacitance exists between the corresponding common electrode signal line 101 and the corresponding sensor electrode 105. When the AC signal is provided to the common electrode signal line 101 during the time interval between display of adjacent frames of images, a signal is induced in the sensor electrode 105 due to the existence of the capacitance between the corresponding common electrode signal line 101 and the corresponding sensor electrode 105. The intensity of the accumulated induced signal from a plurality of sensor electrodes 105 in a plurality of pixels is not negligible.

Figure 5:
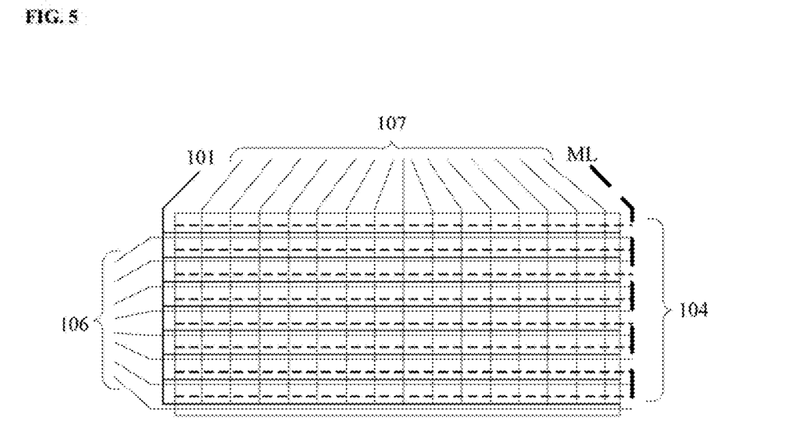
FIG. 5 is an electrical wiring schematic diagram of a display panel in some embodiments.

FIG. 5 is an electrical wiring schematic diagram of a display panel in some embodiments. Referring to FIG. 5, the display panel in the embodiment includes a plurality of gate lines 106, a plurality of data lines 107, a plurality of common electrode signal lines 101, and a plurality of sensor electrode signal lines 104 connected to a main sensor electrode signal line ML. The induced signals in the plurality of sensor electrode are accumulated and transmitted through the plurality of sensor electrode signal lines 104 to the main sensor electrode signal line ML. The induced signal for a sensor electrode around a touch point changes in response to a pressure applied to the display panel. If the induced signal detected when a pressure is applied to the display panel is compared with the accumulated induced signal over the entire display panel when a pressure is not applied to the display panel, the relative change may be a small value. Thus, to increase the detection sensitivity, the induced signal detected when a pressure is applied to the display panel may be compared to an induced signal accumulated from a selected number of sensor electrode signal lines 104 (e.g., 2, 3, 4, or 5 sensor electrode signal lines).

Figure 6:
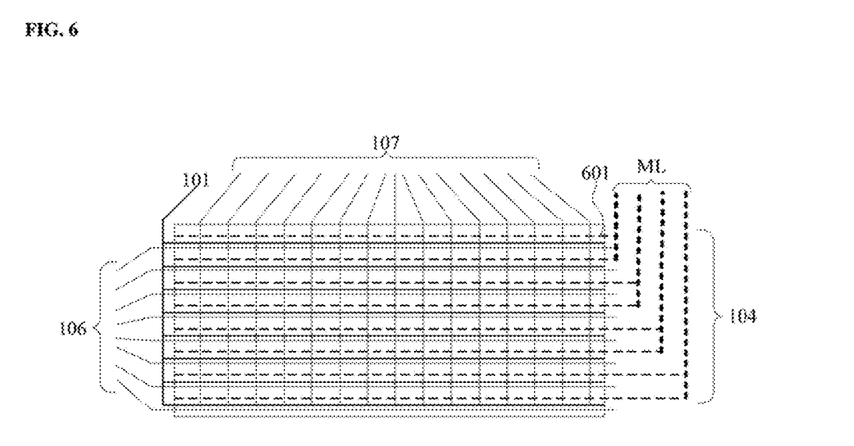
FIG. 6 is an electrical wiring schematic diagram of a display panel in some embodiments.
Figure 7:
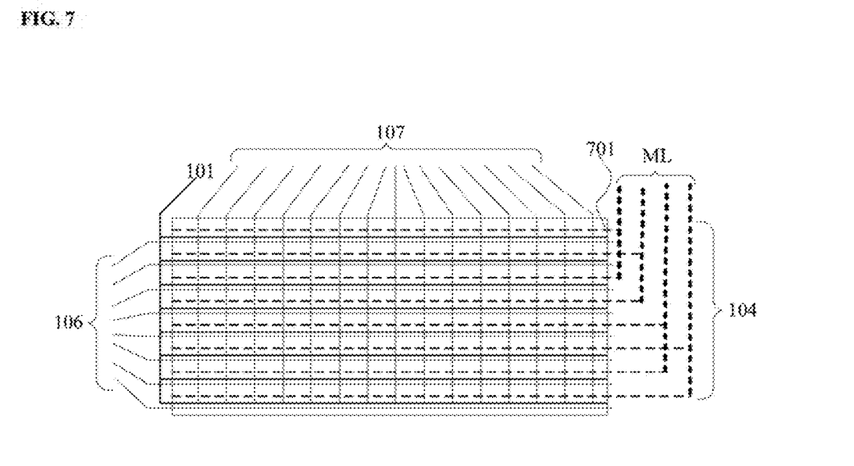
FIG. 7 is an electrical wiring schematic diagram of a display panel in some embodiments.

FIGS. 6 and 7 are electrical wiring schematic diagrams of display panels in some embodiments. Referring to FIGS. 6 and 7, the display panel in the embodiment includes a main sensor electrode signal line layer ML including a plurality of main sensor electrode signal lines. Each of the plurality of main sensor electrode signal lines ML is electrically connected to at least two sensor electrode signal lines. As shown in FIG. 6, each of the plurality of main sensor electrode signal lines ML is electrically connected to at least two adjacent sensor electrode signal lines 104. As shown in FIG. 7, each of the plurality of main sensor electrode signal lines ML is electrically connected to at least two sensor electrode signal lines 104 that are spaced apart by another sensor electrode signal line 104.

Numerous alternative embodiments may be practiced to make the main sensor electrode signal line layer. For example, the main sensor electrode signal line layer may be formed so that each of the plurality of main sensor electrode signal lines is electrically connected to 3, 4, 5, or more sensor electrode signal lines, adjacent or spaced apart.

Figure 8:
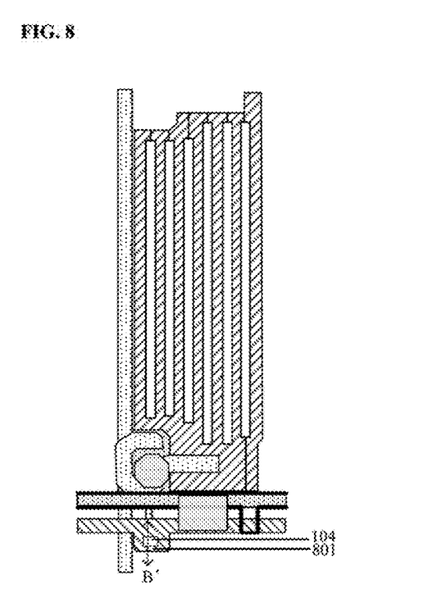
FIG. 8 is a diagram illustrating the structure of a display panel in some embodiments.
Figure 9A:
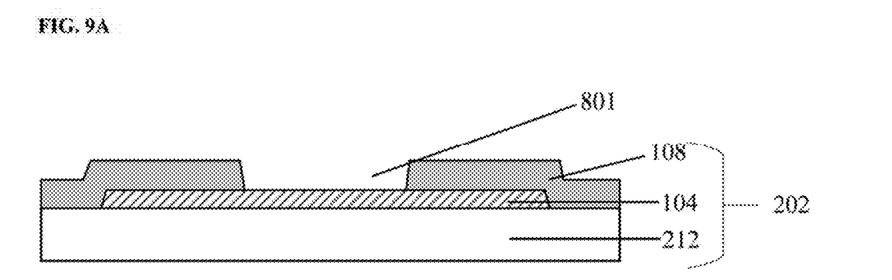
FIG. 9A is a cross-sectional view along the B-B' line in FIG. 8.
Figure 9B:
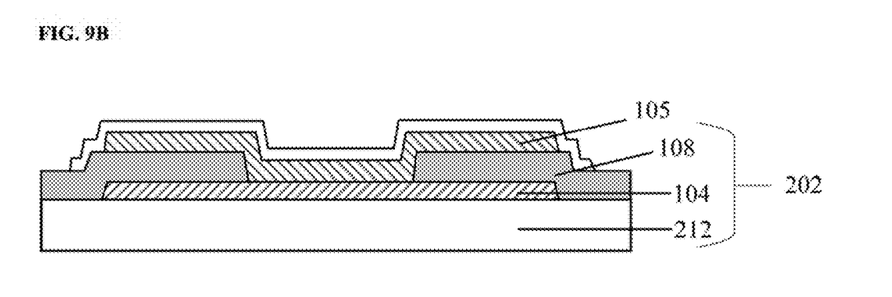
FIG. 9B is a cross-sectional view along the B-B' line in FIG. 8.

FIG. 8 is a diagram illustrating the structure of a display panel in some embodiments. FIGS. 9A and 9B are cross-sectional views along the B-B' line in FIG. 8. Referring to FIGS. 8, 9A, and 9B, the display panel includes an insulating layer 108 between the sensor electrode layer 105 and the sensor electrode signal line layer 104, and a plurality of vias 801 extending through the insulating layer 108. Each of the plurality of the sensor electrodes 105 is electrically connected to each of the plurality of the sensor electrode signal lines 104 through a via 801. FIGS. 9A and 9B illustrate a process of making the via 801 in the display panel. As shown in the FIG. 9A, the insulating layer 108 is formed on a side of the sensor electrode signal line 104 distal to the second base substrate 212. A via 801 is formed extending through the insulating layer 108. As shown in FIG. 9B, the sensor electrode 105 is formed on a side of the insulating layer 108 distal to the sensor electrode signal line 104 by depositing an electrode material layer on the second display substrate 202. The sensor electrode 105 is electrically connected to the sensor electrode signal line 104 through the via 801.

In another aspect, the present disclosure provides a method of fabricating a display panel having a first display substrate and a second display substrate facing the first substrate. In some embodiments, the method includes forming a floating electrode layer on a first base substrate including a plurality of floating electrodes; forming a driving electrode layer on a second base substrate including a plurality of driving electrodes; and forming a sensor electrode layer on the second base substrate including a plurality of sensor electrodes. The floating electrode layer, the common electrode signal line layer, and the sensor electrode layer are formed so that a projection of each of the plurality of floating electrodes at least partially overlaps with a project of a corresponding common electrode signal line and a projection of a corresponding sensor electrode on the second base substrate in plan view of the display panel. The floating electrode layer is formed to be spaced apart from the second base substrate by a distance in the display panel. Optionally, the driving electrode layer is a common electrode signal line layer including a plurality of common electrode signal lines, i.e., the step of forming the driving electrode layer includes forming a common electrode signal line layer including a plurality of common electrode signal lines.

Optionally, the floating electrode includes a floating conductive material. For example, the floating electrode may be made of a conductive material, or may be coated with a layer of conductive material on its surface, e.g., the surface proximal to the common electrode signal line and the sensor electrode.

Optionally, the common electrode signal line layer and the sensor electrode layer are formed in a same layer.

Optionally, the method further includes forming a sensor electrode signal line layer having a plurality of sensor electrode signal lines, each of the plurality of sensor electrode signal line is formed to be electrically connected to each of the plurality of sensor electrodes.

Optionally, the sensor electrode signal line layer and the common electrode signal line layer are formed in different layers, the plurality of sensor electrode signal lines and the plurality of common electrode signal lines are formed to extend along a substantially the same direction.

Optionally, the method further includes forming a gate line layer having a plurality of gate lines. Optionally, the gate line layer and the common electrode signal line layer are formed in different layers. Optionally, the gate line layer and the common electrode signal line layer are formed so that a projection of the gate line layer substantially overlaps with a projection of the common electrode signal line layer on the second base substrate in plan view of the display panel.

Optionally, the method further includes forming a spacer layer having a plurality of spacers for maintaining a spacing between the first display substrate and the second display substrate. The thickness of the floating electrode layer is less than a thickness of the spacer layer. Optionally, the method includes forming the floating electrode layer and the spacer layer in a same process, e.g., in a same layer. Optionally, the floating electrode layer and the spacer layer may be both formed using a conductive material, or a dielectric material doped with a conduction material. Optionally, the step of forming the floating electrode layer includes forming an insulating sub-layer and forming a conductive sublayer, the conductive sublayer being formed on a side of the insulating sub-layer proximal to the second display substrate. Optionally, the method includes forming the insulating sub-layer of the floating electrode layer and the spacer layer using a dielectric material in a same process, e.g., in a same layer;

and forming the conductive sub-layer on a side of the insulating sub-layer proximal to the second display substrate.

Figure 10:
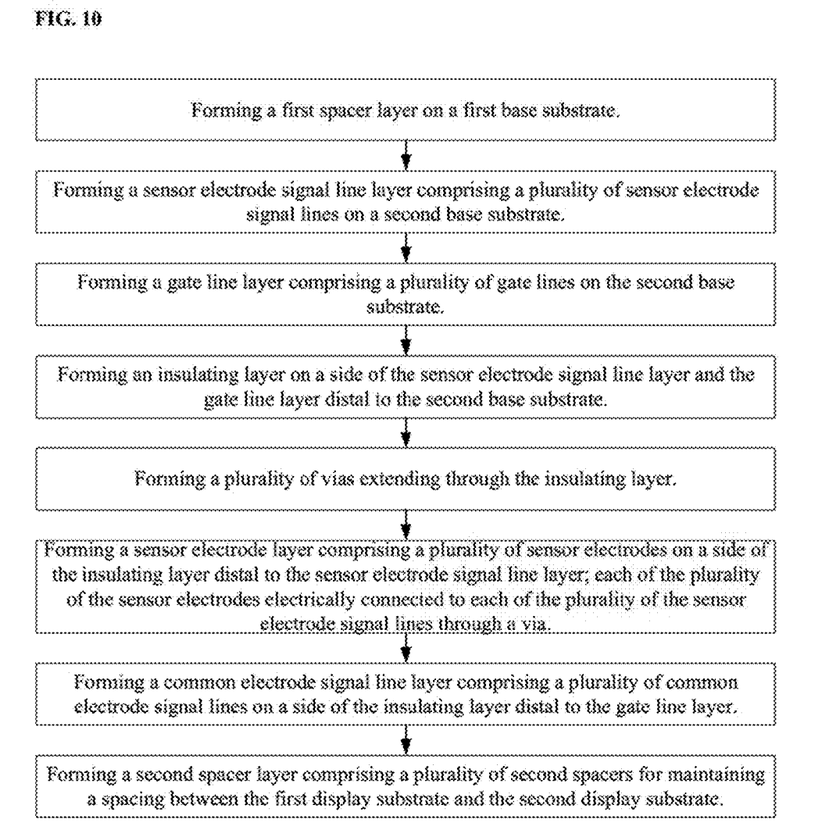
FIG. 10 is a flow chart illustrating a method of fabricating a display panel in some embodiments.

FIG. 10 is a flow chart illustrating a method of fabricating a display panel in some embodiments. Referring to FIG. 10, the method in the embodiment includes forming a floating electrode layer on a first base substrate; forming a sensor electrode signal line layer including a plurality of sensor electrode signal lines on a second base substrate; forming a gate line layer including a plurality of gate lines on the second base substrate; forming an insulating layer on a side of the sensor electrode signal line layer and the gate line layer distal to the second base substrate; forming a plurality of vias extending through the insulating layer; forming a sensor electrode layer including a plurality of sensor electrodes on a side of the insulating layer distal to the sensor electrode signal line layer; each of the plurality of the sensor electrodes electrically connected to each of the plurality of the sensor electrode signal lines through a via; forming a common electrode signal line layer including a plurality of common electrode signal lines on a side of the insulating layer distal to the gate line layer; and forming a spacer layer including a plurality of spacers for maintaining a spacing between the first display substrate and the second display substrate.

In another aspect, the present disclosure provides a method for sensing pressure in a display panel. In some embodiments, the method includes detecting a first signal at the corresponding sensor electrode when a pressure is applied to the display panel; and determining an amount of pressure applied to the display panel based on the first signal. The amount of pressure applied to the display panel may be determined by, e.g., comparing the first signal with a control value, and determining the amount of the pressure applied to the display panel based on the result of comparison.

In some embodiments, the method further includes a step of detecting a second signal at the corresponding sensor electrode in absence of the pressure. In this case, the control value may be a second signal detected at the corresponding sensor electrode in absence of the pressure.

In some embodiments, the method further includes providing an AC signal to the common electrode signal line layer in a time interval between display of two adjacent frames of images in the display panel. The first signal and the second signal are detected in response to the AC signal provided to the common electrode signal line layer.

The amount of applied pressure may be correlated to a signal difference between the first signal and the second signal based on the result of comparison between the first signal and the second signal. Based on the determined amount of applied pressure, the touch event may be categorized into, e.g., a tap, a press (e.g., a light press or a soft press), a push (e.g., a deep press or a hard press), etc. For example, a plurality of threshold values of the signal difference between the first signal and the second signal may be used for categorizing the touch event. Examples of threshold values include, but are not limited to, a tap threshold value, a light press threshold value, and a deep press threshold value. When the signal difference is larger than the tap threshold value by still less than that light press threshold value, the touch event may be determined to be a tap. When the signal difference is between the light press threshold value and the deep press threshold value, the touch event may be determined to be a light press. When the signal difference is larger than the deep press threshold value, the touch event may be determined to be a deep press.

In another aspect, the present disclosure provides a display apparatus having a display panel described herein or fabricated by a method described herein. Examples of appropriate display apparatuses include, but are not limited to, an electronic paper, a mobile phone, a tablet computer, a television, a monitor, a notebook computer, a digital album, a GPS, etc.

The present disclosure provides a pressure sensing display panel, a display apparatus having the same, a method of sensing pressure in the display panel, and a fabricating method thereof. In the present pressure sensing display panel and pressure sensing method, the floating electrode layer, the common electrode signal line layer, and the sensor electrode layer are configured so that at least one of the plurality of floating electrodes is movable relative to at least one of (e.g., both) a corresponding common electrode signal line and a corresponding sensor electrode in response to a pressure from a touch, resulting in a detectable capacitance change between the corresponding common electrode signal line and the corresponding sensor electrode. The capacitance change results in a signal change in the sensor electrode. The amount of pressure applied to the display panel may be determined based on the signal change.

In some embodiments, the display apparatus further includes a processor configured to detect a first signal at the corresponding sensor electrode when a pressure is applied to the display panel; and configured to determine an amount of pressure applied to the display panel based on the first signal. In one example, the processor includes a comparator configured to compare the first signal with a control value thereby determining the amount of pressure applied to the display panel based on a result of comparing. Optionally, the control value is a second signal detected at the corresponding sensor electrode in absence of the pressure. Optionally, the processor is configured to detect a second signal at the corresponding sensor electrode in absence of the pressure.

Optionally, the display apparatus further includes a controller configured to provide an AC signal to the driving electrode layer in a time interval between display of two adjacent frames of images in the display panel. Optionally, the processor is configured to detect the first signal in response to the AC signal provided to the driving electrode layer.

Embodiments of the present disclosure can include systems for implementing the described methods, as well as computer-readable storage medium coded with instructions for causing a computer to execute the described methods. For example, an electronic system including a processor, a memory and an electronic communication device may be configured to implement the described methods. The system may represent a user computer system, wireless communication devices, subnetworks, a server, or any other network-capable device with the requisite functional capabilities.

The system and servers may include any number of processors that are coupled to storage devices including a first storage (typically a random access memory, or "RAM"), second storage (typically a read only memory, or "ROM"). Both of these storage devices may include any suitable type of the computer-readable media described and/or mentioned above. A mass storage device may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

A computer system may also include an interface that includes one or more input/output devices such as video monitors, track balls, mice, keyboards, microphones, touch-sensitive displays, transducer card readers, magnetic or paper tape readers, tablets, styluses, voice or handwriting recognizers, or other known input devices, including other appropriately linked computers. The system may be coupled to a computer or other electronic communication network using a network connection. The network can connect various wired, optical, electronic and other known networks to exchange information among computers, servers, wireless communication devices, and sub-networks. With such a network connection, it is contemplated that the system and the processor(s) therein may receive information from the network, or may output information to the network in the course of performing the above-described method steps. The hardware elements described above may be configured to act as one or more units for performing the operations described above.

In addition, embodiments of the present disclosure further include computer-readable storage media that include program instructions for performing various computer-implemented operations of the described methods. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel having a first display substrate and a second display substrate facing the first display substrate, comprising:

a floating electrode layer comprising a plurality of floating electrodes on the first display substrate; the floating electrode layer being spaced apart from the second display substrate by a distance;

a driving electrode layer comprising a plurality of driving electrodes on the second display substrate; and a sensor electrode layer comprising a plurality of sensor electrodes on the second display substrate; each of the plurality of floating electrodes corresponding to a pair of driving electrode and sensor electrode;

wherein the floating electrode layer, the driving electrode layer, and the sensor electrode layer are configured so that at least one of the plurality of floating electrodes is movable relative to at least one of a corresponding driving electrode and a corresponding sensor electrode in response to a pressure from a touch, resulting in a detectable capacitance change between the corresponding driving electrode and the corresponding sensor electrode;

an orthographic projection of each of the plurality of floating electrodes on the second display substrate at least partially overlaps with an orthographic projection of one of the plurality of driving electrodes on the second display substrate, and at least partially overlaps with an orthographic projection of one of the plurality of sensor electrodes on the second display substrate; and the driving electrode layer is a common electrode signal line layer comprising a plurality of common electrode signal lines configured to provide a common voltage to a common electrode.

2. The display panel of claim 1, wherein the common electrode signal line layer is operated in a time-division driving mode; the time-division driving mode comprises a display mode and a touch control mode; the common electrode signal line layer is configured to provide the common voltage to the common electrode in the display mode, and is configured to drive pressure sensing in the touch control mode.

3. The display panel of claim 1, wherein the pressure from the touch results in a first change in distance between the at least one of the plurality of floating electrodes and the corresponding driving electrode, and a second change in distance between the at least one of the plurality of floating electrodes and the corresponding sensor electrode; the detectable capacitance change is generated in response to the first change in distance and the second change in distance.

4. The display panel of claim 1, wherein each of the plurality of floating electrodes comprising a floating conductive material.

5. The display panel of claim 1, wherein the driving electrode layer and the sensor electrode layer are in a same layer.

6. The display panel of claim 1, further comprising a sensor electrode signal line layer comprising a plurality of sensor electrode signal lines; each of the plurality of sensor electrode signal line electrically connected to each of the plurality of sensor electrodes.

7. The display panel of claim 6, wherein the sensor electrode signal line layer and the driving electrode layer are in different layers, the plurality of sensor electrode signal lines and the plurality of driving electrodes extending along a substantially the same direction.

8. The display panel of claim 6, further comprising an insulating layer between the sensor electrode layer and the sensor electrode signal line layer; and a plurality of vias extending through the insulating layer, each of the plurality of the sensor electrodes electrically connected to each of the plurality of the sensor electrode signal lines through a via.

9. The display panel of claim 6, further comprising a gate line layer comprising a plurality of gate lines; the gate line layer and the driving electrode layer are in different layers; a projection of the gate line layer substantially overlaps with a projection of the driving electrode layer on the second display substrate in plan view of the display panel.

10. The display panel of claim 1, further comprises a spacer layer comprising a plurality of spacers for maintaining a spacing between the first display substrate and the second display substrate;
wherein a thickness of the floating electrode layer is less than a thickness of the spacer layer.

11. The display panel of claim 6, further comprising a main sensor electrode signal line layer comprising a plurality of main sensor electrode signal lines; each of the plurality of main sensor electrode signal lines being electrically connected to at least two sensor electrode signal lines.

12. The display panel of claim 11, wherein each of the plurality of main sensor electrode signal lines is electrically connected to at least two adjacent sensor electrode signal lines.

13. The display panel of claim 11, wherein each of the plurality of main sensor electrode signal lines is electrically connected to at least two sensor electrode signal lines that are spaced apart by at least one sensor electrode signal line.

14. A display apparatus, comprising a display panel of claim 1.

15. The display apparatus of claim 14, further comprising a processor configured to detect a first signal at the corresponding sensor electrode when a pressure is applied to the display panel; and configured to determine an amount of pressure applied to the display panel based on the first signal.

16. The display apparatus of claim 15, wherein the processor comprises a comparator configured to compare the first signal with a control value thereby determining the amount of pressure applied to the display panel based on a result of comparing.

17. The display apparatus of claim 16, wherein the processor is configured to detect a second signal at the corresponding sensor electrode in absence of the pressure; and the control value is the second signal detected at the corresponding sensor electrode in absence of the pressure.

18. The display apparatus of claim 15, further comprising a controller configured to provide an AC signal to the driving electrode layer in a time interval between display of two adjacent frames of images in the display panel;
wherein the processor is configured to detect the first signal in response to the AC signal provided to the driving electrode layer.

19. A method of fabricating a display panel having a first display substrate and a second display substrate facing the first display substrate, comprising:
forming a floating electrode layer comprising a plurality of floating electrodes on a first base substrate;
forming a driving electrode layer comprising a plurality of driving electrodes on a second base substrate; and
forming a sensor electrode layer comprising a plurality of sensor electrodes on the second base substrate;
wherein the floating electrode layer, the driving electrode layer, and the sensor electrode layer are formed so that a projection of each of the plurality of floating electrodes at least partially overlaps with a project of a corresponding driving electrode and a projection of a corresponding sensor electrode on the second base substrate in plan view of the display panel; and the floating electrode layer is formed to be spaced apart from the second base substrate by a distance in the display panel;
the floating electrode layer is formed so that an orthographic projection of each of the plurality of floating electrodes on the second display substrate at least partially overlaps with an orthographic projection of one of the plurality of driving electrodes on the second display substrate, and at least partially overlaps with an orthographic projection of one of the plurality of sensor electrodes on the second display substrate; and
the driving electrode layer is a common electrode signal line layer comprising a plurality of common electrode signal lines configured to provide a common voltage to a common electrode.

20. A method for sensing pressure in the display panel of claim 1, comprising:
detecting a first signal at one of the plurality of sensor electrodes when a pressure is applied to the display panel; and
determining an amount of pressure applied to the display panel based on the first signal.

* * * * *